Jan. 18, 1949.  H. C. HAYES  2,459,162
ACOUSTICAL SOUND LOCATING DEVICE
Filed Nov. 16, 1940
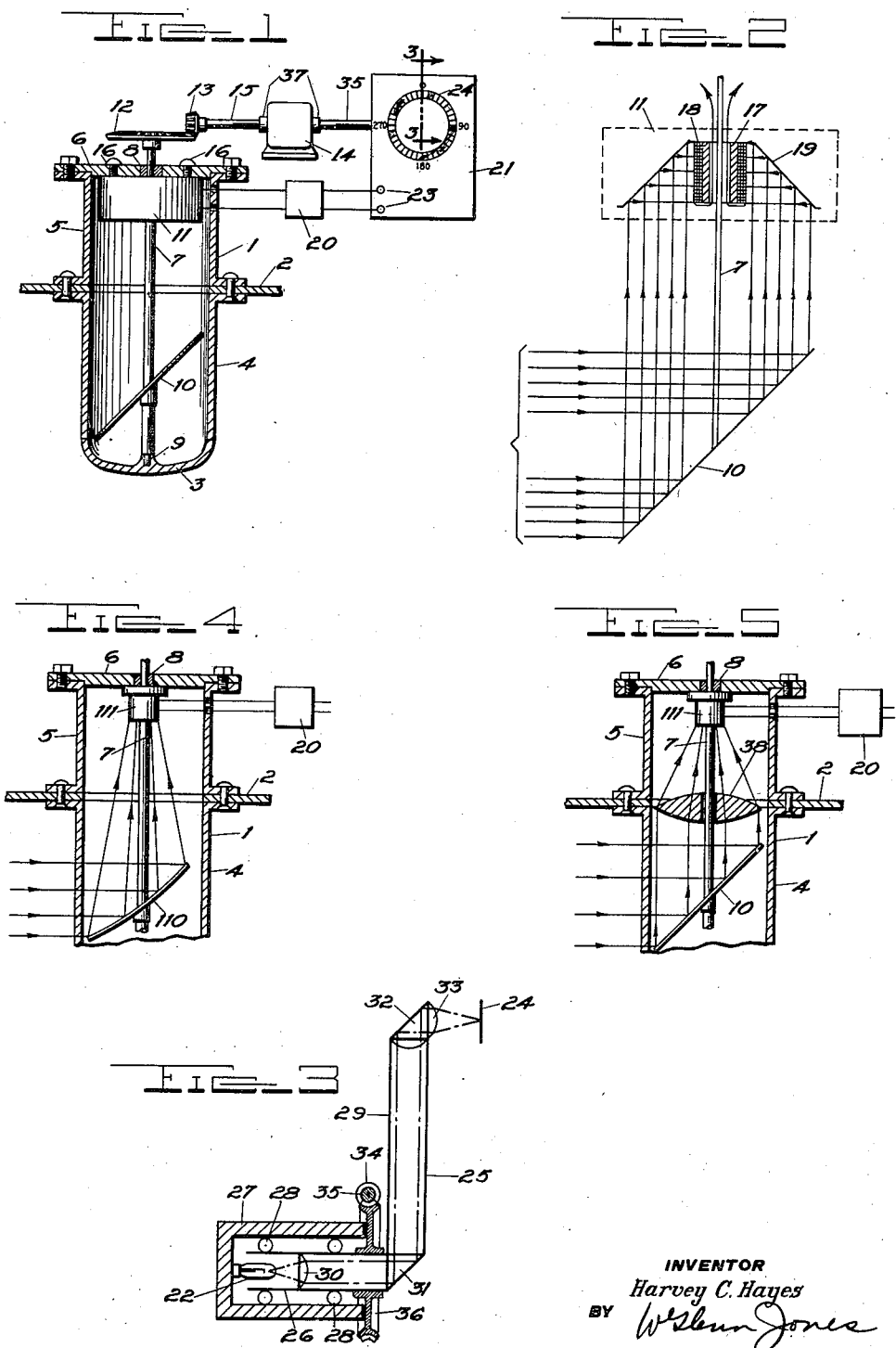
INVENTOR
*Harvey C. Hayes*
BY
*W. Glenn Jones*
ATTORNEY Patented Jan. 18, 1949

2,459,162

UNITED STATES PATENT OFFICE 2,459,162

ACOUSTICAL SOUND LOCATING DEVICE

Harvey C. Hayes, Washington, D. C.

Application November 16, 1940, Serial No. 365,922

10 Claims. (Cl. 181—26)

(Granted under the act of March 3, 1883, as amended April 30, 1928; 370 O. G. 757)

My invention relates to an acoustical apparatus and more particularly to an apparatus of the stated character adapted for subaqueous use that is capable of determining the direction of an emitted compressional sound wave. As such the apparatus is of great utility during conditions of low visibility in aiding and safeguarding navigaton about and within traffic congested areas, such as harbors and the environs of light ships.

In my application Ser. No. 157,566, filed August 5, 1937, there is disclosed an apparatus for determining the direction of an emitted compressional sound wave that includes a rotatable directive receiver of compressional wave energy and a visual indicator responsive to the receiver for indicating the direction of any intercepted compressional wave. While the apparatus there disclosed is an entirely operative and useful structure it does have certain inherent electrical, acoustical and mechanical disadvantages.

The electrical energy generated by the receiver attending the interception of a compressional wave is taken from the rotatable shaft supporting the receiver by slip rings and brushes to make possible the energization of the visual indicator. Since the energy so generated is of low intensity it must be considerably amplified to insure operation of the indicator. The variations, however, in the contact resistance between the brushes and slip rings under such conditions of amplification may and sometimes do produce spurious responses of the indicator that are confusing and often difficult to eliminate.

Turbulence about the rotating receiver caused by rotational and translational movements of the same through the fluid medium results in an abnormal background noise, for the reason that the sensitive sound receiving elements of the receiver are located close to the turbulent area or the local noise source. Since the overall signal to noise ratio is thereby reduced the range of detection of the apparatus is correspondingly curtailed.

Finally, the rotatable receiver is necessarily heavy and expensive by virtue of the requirement of directivity. The directivity of the receiver is determined by the dimensions of its receiving area with reference to the wave length of the received sound. Where the receiver is to be employed as a navigational aid for determining the direction of a compressional sound wave, the dimensions of the receiving area should equal several wave lengths of the received sound and preferably more. This, of necessity, results in a cumbersome and costly structure as already noted.

The foregoing disadvantages are effectively overcome by the apparatus of the present invention which includes a housing pervious to compressional wave energy and a stationary receiver of compressional wave energy. A rotatably mounted reflector is disposed within said housing for reflecting at least a part of any intercepted compressional wave energy in the direction of the receiver for incidence thereupon, the direction of the emitted compressional wave being determined by a visual indicator controlled by the receiver and reflector. The dimensions of the reflector relative to the wave length of the intercepted sound waves are such as to insure directivity.

Since the receiver in the apparatus of the present invention is stationarily mounted slip rings and brushes are not required, thus effectually eliminating any possibility of a spurious response in the indicator. Furthermore, since directivity and azimuthal scanning are achieved through the use of a rotatable reflector, great economy in weight and expense necessarily ensues since the receiver may be made smaller if desired. The mechanical difficulties attending the rotation of a heavy receiver are also largely overcome since the reflector is of relatively light construction.

The overall signal to noise ratio may be noticeably improved in the apparatus of the present invention by properly spacing the stationarily mounted receiver from the rotatable reflector to thus remove its sound sensitive elements from the turbulent area. Since the received intensity of the local noises varies inversely as the square of the distance of the sensitive elements from the turbulent area, the reduction of the noise background becomes marked. The overall signal to noise ratio may be further improved by focusing any horizontally directed compressional wave energy on the receiver to the substantial exclusion of the background noise.

My improved apparatus therefore not only makes it possible to measurably increase the range of sound detection but also possesses the very marked advantage of making the receiver accessible for inspection or repair without docking of the vessel or making necessary the installation of large and expensive gate valves.

In the light of the foregoing it is among the several objects of my invention to provide an improved, simple and effective apparatus that is free from spurious indications for determining the direction of an emitted compressional sound wave; to provide an apparatus of the stated character in which the range of sound detection is measurably enhanced; and to provide an apparatus as above noted that is of a durable, economical and conveniently accessible construction.

These and other objects and many of the attendant advantages of this invention will be readily appreciated as the same becomes better understood by reference to the following detailed description when considered in connection with the accompanying sheet of drawings wherein:

Fig. 1 is a view partially in section of one embodiment of the apparatus of the present invention;

Fig. 2 is a sectional schematic representation of one type of receiver that may be employed in the embodiment of Fig. 1 shown in its relation to the rotatable reflector;

Fig. 3 is a fragmentary partial sectional view of the visual indicator taken on the line 3—3 of Fig. 1 showing a source of radiant energy energizable by the receiver and a rotatably mounted optical system synchronously operable with the reflector;

Fig. 4 is a view partially in section of a further embodiment of the apparatus of the present invention in which the rotatable reflector focuses any horizontally directed compressional wave energy to the substantial exclusion of the background noise in the direction of a relatively small receiver for incidence thereupon to further increase the range of sound detection; and Fig. 5 is a view partially in section of a still further embodiment of the apparatus of the present invention in which an acoustical lens is employed for focusing any horizontally directed compressional wave energy to the substantial exclusion of the background noise in the direction of a relatively small receiver for incidence thereupon to further augment the range of sound detection.

Turning now to the drawings and more particularly to Figs. 1 to 3 thereof, there is shown depicted therein a fluid tight housing 1 projecting downwardly through the hull plate 2 of a vessel into a fluid medium and closed at its lower end by a cap 3 of streamlined configuration. The housing 1 is, for convenience of mounting but not necessarily, made in two parts riveted to the apertured hull plate 2 in the manner shown, the lower part 4 being pervious to compressional wave energy and the upper part 5 being provided with a removable closure plate 6.

While the fluid tight housing 1 may take many forms, it is preferred that it approximate a surface of revolution about its longitudinal axis, as disclosed and claimed in my application Ser. No. 73,389, filed April 8, 1936, in order to reduce to a minimum the turbulent layer about the housing and hence the background noise incidental to movements of translation of the housing through the fluid medium at the relatively higher speeds encountered in use. The housing shown in the drawings is for illustrative purposes taken as a cylinder with its longitudinal axis substantially normal to the hull plate 2 and is provided with a liquid or fluid medium having an acoustical impedance substantially equal to that of the propagational medium contacting the housing exterior.

A shaft 7 substantially coincident with the longitudinal axis of the cylindrical housing 1 is rotatably mounted in suitable bearings 8 and 9 of the closure plate 6 and end cap 3 respectively and has rigidly secured thereto in the lower housing part 4 a substantially planar reflector 10 of compressional wave energy. The rotatable reflector 10 has such dimensions relative to the wave length of the intercepted sound waves as to insure proper directivity; and is mounted on the shaft 7 in a manner to reflect any intercepted compressional wave energy in the direction of the receiver 11 for incidence thereupon.

In the embodiment depicted in the drawings the reflector 10 is shown by the way of example as mounted at an angle of approximately 45° to the shaft 7 so as to reflect vertically upward any intercepted horizontally directed compressional wave energy in its azimuthal scannings. The shaft 7 is rotated at any desired speed to impart to the reflector 10 a predetermined number of azimuthal scannings per unit of time, this being achieved by the bevel gear 12 secured to the reflector shaft 7, the pinion 13 meshing therewith and a suitable motor 14 driving the pinion through the shaft 15.

The receiver 11 may be of any known prior art construction but is preferably either of the piezoelectric or magnetostrictive type. As shown in the drawings the receiver 11 is stationarily but removably mounted on the closure plate 6 by any suitable means such as the screws 16 and is spaced from the reflector 10 in a manner to remove its sound sensitive surface from the turbulent area about the housing part 4. This has the very beneficial effect of producing a marked reduction of the noise background in the receiver 11 and thus of enhancing the range of sound detection. Furthermore, the mounting of the receiver 11 in the manner shown makes it readily accessible for inspection or repair without docking the vessel or providing for the installation of large and expensive valves, as previously noted herein.

The receiver 11 is shown purely by way of example in Fig. 2 of the drawings as of the magnetostrictive type and is described and disclosed in detail in U. S. Patent No. 2,005,741, granted to me June 25, 1935. As indicated schematically in Fig. 2 the receiver 11 includes a tube 17 of magnetostrictive material surrounded by a toroidal current conducting coil 18, the tube and coil having such dimensions as to permit free passage and rotation of the reflector shaft 7 through the composite unit. A frustoconical reflector 19 of compressionable wave energy arranged at an angle of 45° for cooperation with the rotatable reflector 10 is disposed circumferentially of the magnetostrictive unit for reflecting the vertically directed sound waves in a radial direction through the interstices of the toroidal coil 18 and into incidence with the magnetostrictive tube 17.

The sound energy reflected by the reflector 19 into radial incidence with the magnetostrictive tube 17 sets up compressional strains tending to vary the cross section of the tube. These strains change the magnetic permeability of the tube material which is magnetically polarized circumferentially thereby causing the magnetic flux to cut across the toroidal coil 18 and to generate electromotive forces therein of the same character as the sound waves. These electromotive forces are amplified by any prior art amplifier 20 for energizing the visual indicator identified in general by the reference character 21.

The visual indicator 21 controllable by the reflector 10 and the receiver 11 may be of any convenient construction. It is shown by way of illustration in Figs. 1 and 3 of the drawings as including a source of radiant energy 22, such as a neon lamp, connected to the output terminals 23 of the amplifier 20 for energization thereby, a scale 24 for indicating the direction of the emitted compressional sound wave, and an optical system identified in general by the reference character 25 rotating in synchronism with the reflector 10 for projecting any light from the radiant energy source 22 onto the scale 24.

The optical system includes a hollow shaft 26 centrally and rotatably mounted with reference to the annular scale 24 on a stationary member 27 by means of any convenient bearings 28, the axis of said shaft being in substantial alignment with the source of radiant energy 22. To the upper end of the shaft 26 there is secured an arm 29 the free end of which is positioned in juxtaposed relation to the scale 24. Any light or radiant energy emitted by the source 22 is collimated by the lens 30, reflected along arm 29 by the right angle prism 31, is then reflected vertically upward by the right angle prism 32 and brought to focus on the scale 24 by the lens 33. The neon lamp 22 is shown disposed at the focal point of the lens 30; and the lens 33 is preferably cylindrical and arranged at a distance beneath the scale 24 equal to its focal length to give a line image on the scale.

The scale 24 is suitably graduated to indicate bearings and for this purpose may, if desired, be provided with indicia from 0° to 360°. It is evident to those skilled in the art that the annular scale 24 may be opaque in character with perforated, transparent or translucent indicia through which the light may be projected; or may be transparent or translucent in character with opaque inscribed indicia.

Any convenient means may be employed for operating the visual indicator 21 and rotatable reflector 10 in synchronism. As shown in the drawings, by way of example, the hollow shaft 26 and arm 29 carried thereby are made to rotate in synchronism with the shaft 7 and reflector 10 through the worm 34 of the motor shaft 35 in meshing engagement with the worm gear 36 rigidly secured to the hollow shaft 26. Relative rotative adjustment between the motor shafts 15 and 35 is made possible by the armature flange couplings 37 in order to establish the proper phase relationship between the reflector 10 and the arm 29 of the rotating optical system.

The phasing between the reflector 10 and the rotating arm 29 of the optical system is preferably adjusted so that the arm 29 sweeps past the zero bearing of the scale 24 the instant the directive axis of the reflector 10 sweeps past this relative bearing. It thus follows that any light flashes on the scale 24 attending the interception of any compressional wave energy by the reflector 10 in its azimuthal scannings will indicate the respective relative bearings of the emitted sound waves producing the flashing or occulting effect of the source of radiant energy.

In operation the gain of amplifier 20 is adjusted to the point where the amplified electromotive forces of the receiver 11 caused by the incidence of the local noises thereupon just fail to cause energization of the lamp 22 and operation of the indicator 21. This adjustment having been made the rotatable reflector 10 will reflect any intercepted horizontally directed compressional wave energy encountered in its azimuthal scannings into incidence with the receiver 11, which in turn will cause the lamp 22 to be energized and the bearing of the intercepted sound wave to be indicated on the scale 24 of the visual indicator, provided that the intercepted compressional wave is more intense than the local background noise. The noise background for directions approximately astern is always high when the vessel is under way because its own propeller sounds are then focused on the receiver. The range of detection, however, for bearings other than approximately astern is considerably higher. In one embodiment constructed in accordance with the teachings of the present invention the range of detection for the latter bearings varied from 1,000 to 5,000 yards or more depending upon the water conditions. For the embodiment so constructed 2,500 yards appeared to be the average range of detection. The ranges herein set forth are given purely by way of illustration and are not to be construed as limiting ranges.

The embodiments depicted in Figs. 4 and 5 of the drawings are identical in construction and operation with that of Figs. 1 to 3 except that a relatively small receiver is employed and means is provided for focusing the relatively large horizontally directed compressional sound wave in the direction of the receiver for incidence thereupon to the substantial exclusion of the background noises. Thus the receiver 111 in Figs. 4 and 5 may be a replica on a smaller scale of the receiver 11 depicted in Fig. 2 with its frustoconical reflector arranged to insure substantially radial incidence of the sound energy on the magnetostrictive tube, or the receiver 111 may be of any other known prior art construction preferably of either the piezo-electric or magnetostrictive type but centrally apertured to permit free passage and rotation of the reflector shaft 7. The receivers 111 in Figs. 4 and 5 may be mounted in any suitable manner on the closure plate 6.

In Fig. 4 any horizontally directed compressional wave energy is reflected in the direction of the receiver 111 for incidence thereupon by a suitable concaved reflector 110, while in Fig. 5 the reflector construction 10 of Fig. 1 is retained and a suitably supported apertured acoustical lens 38 of proper refractive index is employed instead for refracting the horizontally directed compressional wave energy from the reflector 10 in the direction of the receiver 111 for incidence thereupon. In both embodiments of Figs. 4 and 5 the energy intercepting area of the receiver 111 upon which the horizontally directed sound waves are incident is small relatively to that of the rotatable reflector.

The construction employed in Figs. 4 and 5 not only reduces the cost of the receiver but at the same time strengthens its response to horizontally directed sound waves which are focused on its sound sensitive area and weakens its response to the local noises which in general are not so focused. Thus, by focusing any horizontally directed compressional wave energy in the direction of the receiver for incidence thereupon to the substantial exclusion of the background noise, the overall signal to noise ratio is materially improved to thereby further enhance the range of sound detection.

According to the provisions of the patent statutes, I have set forth the principle and mode of operation of my invention and have illustrated and described what I now consider to represent its best ambodiments. However, I desire to have it understood that within the scope of the appended claims the invention may be practiced otherwise than as specifically illustrated and described.

The invention herein described and claimed may be used and manufactured by or for the Government of the United States of America for governmental purposes without the payment of any royalties thereon or therefor.

I claim:

1. An apparatus for determining the direction of an emitted compressional wave comprising in combination a stationary housing pervious to compressional wave energy, a receiver of compressional wave energy, a reflector disposed within said housing and rotatable therein independently of the housing for reflecting at least a part of any intercepted compressional wave energy in the direction of said receiver for incidence thereupon, and visual means controllable by said receiver and reflector for indicating the direction of the compressional wave.

2. An apparatus for determining the direction of an emitted compressional wave comprising in combination a stationary housing pervious to compressional wave energy, a stationarily mounted receiver of compressional wave energy, a reflector disposed within said housing and rotatable therein independently of the housing for reflecting at least a part of any intercepted compressional wave energy in the direction of said receiver for incidence thereupon, and visual means for indicating the direction of the compressional wave, the said means being energizable by the receiver and synchronously operable with the reflector.

3. An apparatus for determining the direction of an emitted compressional wave comprising in combination a stationary housing pervious to compressional wave energy, a stationarily mounted receiver of compressional wave energy, a reflector disposed within said housing and rotatable therein independently of the housing for reflecting at least a part of any intercepted compressional wave energy in the direction of said receiver for incidence thereupon, and visual means controllable by said receiver and reflector for indicating the direction of the compressional wave, the said receiver being spaced from the energy intercepting area of the reflector.

4. An apparatus for determining the direction of an emitted compressional wave comprising in combination a stationary housing pervious to compressional wave energy, a receiver of compressional wave energy, a reflector disposed within said housing and rotatable therein independently of the housing for reflecting at least a part of any intercepted compressional wave energy in the direction of said receiver for incidence thereupon, and visual means controllable by said receiver and reflector for indicating the direction of the compressional wave, the energy intercepting area of the receiver being small relatively to that of the reflector.

5. An apparatus for determining the direction of an emitted compressional wave comprising in combination a stationary housing pervious to compressional wave energy, a receiver of compressional wave energy, a reflector disposed within said housing and rotatable therein independently of the housing for reflecting at least a part of any intercepted compressional wave energy in the direction of said receiver for incidence thereupon, and visual means controllable by said receiver and reflector for indicating the direction of the compressional wave, the energy intercepting area of the receiver being spaced from and being small relatively to that of the reflector.

6. An apparatus for determining the direction of an emitted compressional wave comprising in combination a stationary housing pervious to compressional wave energy, a receiver of compressional wave energy, a reflector disposed within said housing and rotatable therein independently of the housing for reflecting any intercepted horizontally directed compressional wave energy in the direction of said receiver for incidence thereupon, and visual means controllable by said receiver and reflector for indicating the direction of the compressional wave, the energy intercepting area of the receiver being small relatively to that of the reflector.

7. An apparatus for determining the direction of an emitted compressional wave comprising in combination a stationary housing pervious to compressional wave energy, a receiver of compressional wave energy, a reflector disposed within said housing and rotatable therein independently of the housing for reflecting any intercepted horizontally directed compressional wave energy, a lens positioned intermediate said reflector and receiver for refracting the horizontally directed compressional wave energy from the reflector in the direction of said receiver for incidence thereupon, and visual means controllable by said receiver and reflector for indicating the direction of the compressional wave, the energy intercepting area of the receiver being small relatively to that of the reflector.

8. An apparatus for determining the direction of an emitted compressional wave comprising in combination a stationary housing pervious to compressional wave energy, a receiver of compressional wave energy disposed within said housing at one end thereof and a reflector arranged within said housing at the other end thereof for reflecting at least a part of any intercepted compressional wave energy in the direction of said receiver for incidence thereupon, a rotatable shaft substantially coincident with the longitudinal axis of the housing for supporting the reflector, and visual means energizable by the receiver and synchronously operable with the reflector shaft for indicating the direction of the compressional wave.

9. An apparatus for determining the direction of an emitted compressional wave comprising in combination a stationary housing pervious to compressional wave energy, a stationarily mounted receiver of compressional wave energy, a reflector disposed within said housing for reflecting at least a part of any intercepted compressional wave energy in the direction of said receiver for incidence thereupon, a rotatable shaft for supporting the reflector, and visual means energizable by the receiver and synchronously operable with the reflector shaft for indicating the direction of the compressional wave.

10. An apparatus for determining the direction of an emitted compressional wave comprising in combination a stationary housing pervious to compressional wave energy, a stationarily mounted receiver of compressional wave energy, a reflector disposed within said housing for reflecting at least a part of any intercepted compressional wave energy in the direction of said receiver for incidence thereupon, a rotatable shaft for supporting the reflector, and visual means energizable by the receiver and synchronously operable with the reflector shaft for indicating the direction of the compressional wave, the energy intercepting area of the receiver being small relatively to that of the reflector.

HARVEY C. HAYES.

REFERENCES CITED

The following references are of record in the file of this patent:

UNITED STATES PATENTS

| Number | Name | Date |
|---|---|---|
| 768,573 | Mundy | Aug. 23, 1904 |
| 1,002,567 | Davison | Sept. 5, 1911 |
| 1,345,717 | Thomas | July 6, 1920 |
| 1,969,037 | Rieber | Aug. 7, 1934 |
| 2,071,284 | Hyland | Feb. 16, 1937 |

FOREIGN PATENTS

| Number | Country | Date |
|---|---|---|
| 11,333 | Great Britain | Mar. 13, 1919 |
| 703,148 | France | Feb. 2, 1931 |